Aug. 26, 1952 C. J. MILLER 2,608,672

CATHODE-RAY TUBE CIRCUIT

Filed Jan. 20, 1950

WITNESSES:

E. A. McCloskey.

Wm. C. Groome

INVENTOR

Coleman J. Miller.

BY

F. E. Browder

ATTORNEY

Patented Aug. 26, 1952

2,608,672

UNITED STATES PATENT OFFICE 2,608,672

CATHODE-RAY TUBE CIRCUIT

Coleman J. Miller, Catonsville, Md., assignor to Westinghouse Electric Corporation, East Pittsburgh, Pa., a corporation of Pennsylvania Application January 20, 1950, Serial No. 139,696

7 Claims. (Cl. 315—26)

This invention relates to cathode-ray tube circuits, and relates more particularly to sweep circuits for cathode ray tubes.

In an embodiment of this invention, a vacuum tube has negative synchronizing signals applied to its control grid, and it has connected to its plate, a deflection yoke on an associated cathode-ray picture tube, which is tuned by a network to resonate at the fundamental sweep frequency and also at each harmonic up to the tenth or so, the number of harmonics being chosen to provide the desired linearity. The network includes a coil and a capacitor for each resonant frequency, one coil being the yoke. The pulses provided by the synchronizing signals excite each resonant circuit in the proper phase so that a saw tooth oscillation is set up. Since each sync pulse provides only a small fraction of the total circulating energy, the tube need only overcome the losses of the circuit so that a much smaller tube can be used than is required in a normal circuit in which the tube must handle the entire circulating current. Noise immunity similar to that of a standard automatic frequency controlled sync circuit is automatically provided.

In another embodiment of the invention, both the vertical and horizontal sync signals are applied to the grid of the tube, and the vertical and horizontal deflection yokes on the associated cathode-ray tube are connected in series to the plate of the tube. Each yoke is tuned by a network to resonate at its fundamental sweep frequency and at a sufficient number of harmonics thereof for providing the necessary linearity. Because of the tuned nature of the networks, the two sweeps will not interact so that a single tube provides both vertical and horizontal sweep circuits.

In still another embodiment of the invention, the tube having the vertical and horizontal deflection yokes connected in series in its plate circuit, serves also as a sync separator, whereby a single tube provides both vertical and horizontal sweep currents and sync separation.

An object of this invention is to provide a sweep circuit for a cathode-ray tube, in which a deflection yoke is tuned by a network to the fundamental sweep frequency and to a number of harmonics thereof.

Another object of this invention is to provide both vertical and horizontal sweep circuits for a cathode-ray tube, with but a single vacuum tube.

Another object of the invention is to provide vertical and horizontal sweep circuits for a cathode-ray tube, and a sync separation circuit using but a single vacuum tube.

The invention will now be described with reference to the drawing, of which:

Figure 1:
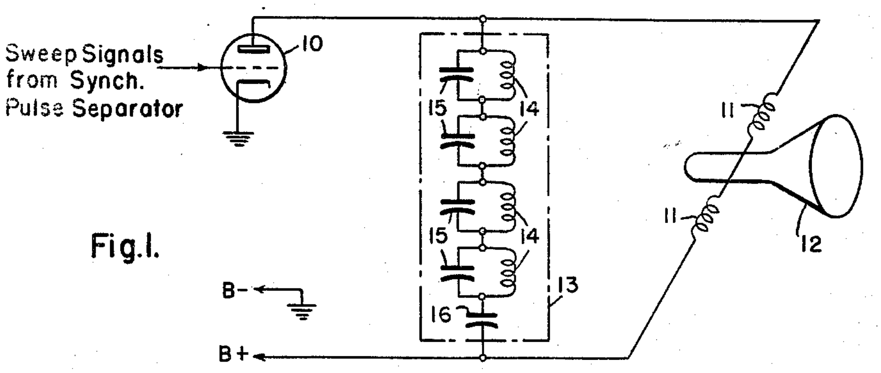
Fig. 1 is a circuit schematic illustrating a sweep circuit embodying this invention, in which a deflection yoke of a cathode ray tube is tuned by a network in the plate circuit of a triode tube.

Referring first to Fig. 1 of the drawing, the triode tube 10 is arranged to have negative synchronizing signals applied to its control grid from a sync pulse separation circuit, which is not illustrated, so that current flows through the tube except during the sync intervals when it is cut-off. The deflection yoke 11, which may be the horizontal deflection yoke, of the cathode-ray tube 12 is connected at one end to the plate of the tube 10, and at its other end to a conventional, direct current plate voltage supply source which is not illustrated.

The deflection yoke 11 is tuned by the network 13 containing the series connected inductors 14, each shunted by a capacitor 15. The end of the deflection yoke which is connected to the plate of the tube 10 is connected to the uppermost of the inductors 14, and its other end is connected through the capacitor 16 to the lowermost of the inductors 14. More coils and capacitors, could be provided, if desired, for extending the linearity of the circuit.

The network 13 tunes the yoke 11 to resonate at the fundamental sweep frequency and at harmonics thereof, one inductor, including the yoke, and one capacitor being required for each resonant frequency. The values of the inductors and capacitors are so selected that the network is not only resonant at the proper frequencies but provides the proper amplitude of each harmonic. The pulses provided by the synchronizing signals excite each resonant circuit in the proper phase such that a sawtooth oscillation is set up. Thus the tube need only overcome the losses in the circuit since it does not handle the entire circulating current as in prior circuits. Since each sync pulse provides only a small fraction of the circulating energy, noise immunity similar to that obtained with a standard, automatic frequency controlled, sync circuit is automatically provided.

Figure 2:
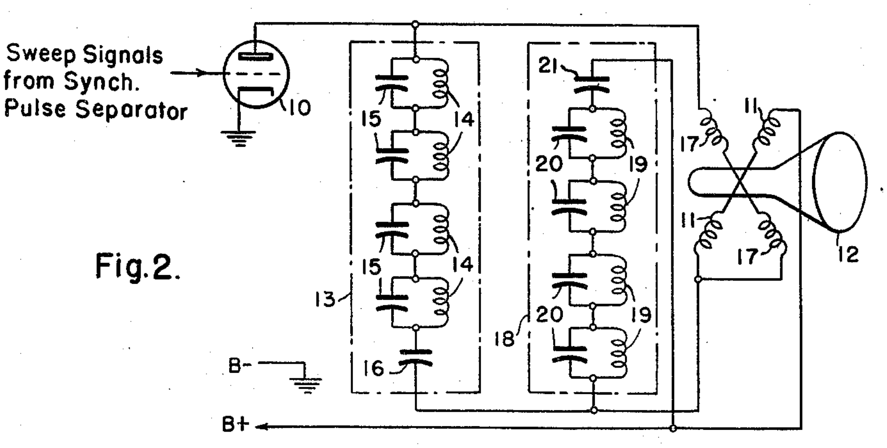
Fig. 2 is a circuit schematic illustrating sweep circuits embodying this invention, in which the vertical and horizontal deflection yokes of a cathode-ray tube are tuned by networks and are connected in series in the plate circuit of a triode tube.

In the circuit of Fig. 2 of the drawing, the composite vertical and horizontal sweep signals from a sync separation circuit which is not illustrated, are applied to the grid of the tube 10. The vertical deflection yoke 17 of the cathode-ray tube 12 is tuned by the network 18 to resonate at its fundamental sweep frequency and at harmonics thereof. The yokes 11 and 17 are connected in series between the plate of the tube 10 and the plate voltage supply source. This network 18 includes the series-connected inductors 19 shunted by the capacitors 20, one inductor, including the yoke 17 and one capacitor being required for each resonant frequency. Due to the tuned nature of the networks 13 and 18 the vertical and horizontal sweep frequencies do not interact.

Figure 3:
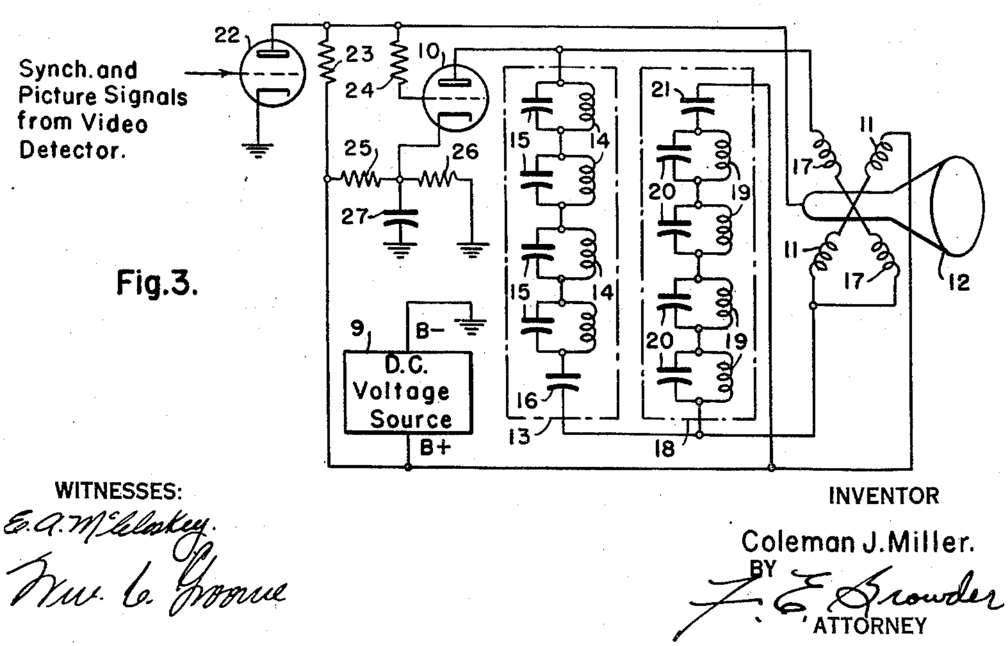
Fig. 3 is a circuit schematic embodying this invention including the circuit of Fig. 2 with the triode tube serving also as a sync separator.

The embodiment of the invention illustrated by Fig. 3 of the drawing, is similar to that of Fig. 2 of the drawing with the tube 10 arranged to perform the additional function of a sync separator. The video amplifier tube has its control grid connected to the output of the video detector of a television receiver, which is not illustrated. Its plate is directly-coupled to the control grid of the cathode-ray tube 12. Its plate is also connected through the load resistor 23 to a positive terminal of the plate voltage supply source 9, and through the resistor 24 to the control grid of the tube 10.

The cathode of the tube 10 is connected to the junction point of the series-connected voltage dividing resistors 25 and 26, the resistor 25 being connected to a positive terminal of the plate voltage supply source 9, and the resistor 26 being connected to ground. The capacitor 27 is connected between the cathode of the tube 10 and ground.

The values of the voltage dividing resistors 25 and 26 are selected so that the potential of the cathode of the tube 10 is at or slightly lower than the potential of the grid of the picture tube 12 at pedestal level, the level of the video signal at which blanking of the beam of the picture tube occurs.

In the operation of the circuit of Fig. 3, for any signal on the control grid of the picture tube 12, this grid will be positive with respect to the cathode of the tube 10 so that the tube 10 will conduct and current will flow through it and through the resistor 24 connected to its grid. This effectively places the resistors 23 and 24 in parallel so that the resistor 23 can be made to have a higher resistance than it ordinarily has in order to maintain proper frequency response. When a synchronizing signal appears, the control grid of the picture tube 12 will go negative with respect to the cathode of the tube 10 so that the tube 10 will become non-conductive. This prevents any current from flowing through the resistor 24 and increases the gain of the tube 22 during the sync period.

When the tube 10 is conducting, its impedance is small compared to the resistance of the resistor 24 and only a small portion of the picture signal variations appear at the deflection yokes 11 and 17. When the tube 10 becomes non-conductive during a sync period, the total signal variation appears at the plate of the tube 10 so that the vertical sweep signals flow through the vertical deflection yoke 17, and the horizontal sweep signals flow through the horizontal deflection yoke 11.

The usual high frequency, compensating chokes have been omitted from Fig. 3 of the drawing for simplicity of illustration.

I claim as my invention:

1. A cathode-ray tube circuit comprising a cathode-ray tube having a control electrode, a video amplifier tube having an anode directly-coupled to said control electrode, a load resistor connected to said anode, a sync separation tube having a control grid, a cathode and an anode, a resistor connecting said grid to said control electrode, means for maintaining said cathode at or slightly less than the potential of said control electrode, at pedestal level, a deflection yoke on said cathode-ray tube connected to said separation tube anode, and means for tuning said yoke to resonate at its fundamental sweep frequency and at a plurality of harmonics thereof.

2. A cathode-ray tube circuit as claimed in claim 1 in which the tuning means comprises an inductor, including said yoke, and a capacitor, for each resonant frequency.

3. A cathode-ray tube circuit comprising a cathode-ray tube having a control electrode, a video amplifier tube having an anode directly-coupled to said control electrode, a load resistor connected to said anode, a sync separation tube having a control grid, a cathode and an anode, a resistor connecting said grid to said control electrode, means for maintaining the potential of said cathode at or slightly less than the potential of said control electrode at pedestal level, vertical and horizontal deflection yokes on said cathode-ray tube, said yokes being connected in series to said separation tube anode, means for tuning said vertical deflection yoke to resonate at its fundamental vertical sweep frequency and at a plurality of harmonics thereof, and means for tuning said horizontal deflection yoke to resonate at its fundamental horizontal sweep frequency and at a plurality of harmonics thereof.

4. A sweep circuit for a cathode-ray tube comprising a vacuum tube having a control grid adapted to be connected to a source of sync-signals and an anode, a cathode-ray tube deflection yoke, said deflection yoke being connected at one end to the anode of said vacuum tube and at the other end to the positive terminal of a potential source, and a network for tuning said yoke to resonate at the fundamental sweep frequency and at a plurality of harmonics thereof, said network being connected to the anode of said vacuum tube and to said positive terminal of said potential source in parallel relationship to said yoke, said network including an inductor and a capacitor for each resonant frequency.

5. A sweep circuit for a cathode-ray tube comprising a vacuum tube having a control grid adapted to be connected to a source of sync-signals and an anode, vertical and horizontal cathode-ray tube deflection yokes, said yokes being connected in series between said anode and the positive terminal of a power source, means for turning said vertical deflection yoke to resonate at the fundamental vertical sweep frequency and at a plurality of harmonics thereof, and means for tuning said horizontal deflection yoke to resonate at the fundamental horizontal sweep frequency and at a plurality of harmonics thereof, each of said tuning means comprising a network connected between the anode of said tube and said positive terminal of said power source in parallel relationship to said yokes, each of said networks including an inductor and a capacitor for each resonant frequency.

6. A sweep circuit for a cathode-ray tube comprising a vacuum tube having a control grid adapted to be connected to a source of sync-signals and an anode, vertical and horizontal cathode-ray tube deflection yokes, said yokes being connected in series between the anode of said tube and the positive terminal of a power source, a network for tuning said vertical deflection yoke to resonate at its fundamental vertical sweep frequency and a plurality of harmonics thereof, said network being connected between the anode of said tube and said positive terminal of said power source in parallel relationship with said vertical deflection yoke, said network comprising one inductor, including said vertical yoke, and one capacitor for each resonant frequency, and a network for tuning said horizontal yoke to resonate at its fundamental horizontal sweep frequency and at a plurality of harmonics thereof, said last-mentioned network being connected between the anode of said tube and said positive terminal of said power source in parallel relationship with said horizontal yoke, said network including one inductor, including said horizontal yoke, and one capacitor for each resonant frequency.

7. A sweep circuit for a cathode-ray tube comprising a vacuum tube having a control grid adapted to be connected to a source of sync-signals and an anode, a cathode-ray tube deflection yoke connected between said anode and the positive terminal of a power source, a network for tuning said yoke to resonate at the fundamental sweep frequency and at a plurality of harmonics thereof connected between said anode and said positive terminal of said power source in parallel relationship with said yoke, said network including an inductor and a capacitor connected in parallel relationship with each other for each resonant frequency, and each of said parallel combinations of inductors and capacitors for each separate resonant frequency being connected in series with each of said other combination of inductor and capacitor.

COLEMAN J. MILLER.

REFERENCES CITED

The following references are of record in the file of this patent:

UNITED STATES PATENTS

| Number | Name | Date |
|---|---|---|
| 2,149,077 | Vance | Feb. 28, 1939 |
| 2,179,607 | Bedford | Nov. 14, 1939 |
| 2,299,571 | Dome | Oct. 20, 1942 |
| 2,499,080 | Webb | Feb. 28, 1950 |